US007928974B2

(12) United States Patent
Toyozawa et al.

(10) Patent No.: US 7,928,974 B2
(45) **Date of Patent: *Apr. 19, 2011**

(54) LIQUID CRYSTAL DISPLAY DEVICE, METHOD FOR CONTROLLING THE SAME, AND PORTABLE TERMINAL

(75) Inventors: Noboru Toyozawa, Kanagawa (JP); Yoshiharu Nakajima, Kanagawa (JP); Yoshihiko Toyoshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 922 days.

This patent is subject to a terminal disclaimer.

(21) Appl. No.: 11/891,251

(22) Filed: Aug. 9, 2007

(65) Prior Publication Data

US 2007/0290968 A1 Dec. 20, 2007

Related U.S. Application Data

(63) Continuation of application No. 10/618,012, filed on Jul. 11, 2003, now Pat. No. 7,271,801.

(30) Foreign Application Priority Data

Jul. 12, 2002 (JP) ................................ 2002-203440

(51) Int. Cl.
*G06F 3/038* (2006.01)
*G09G 5/00* (2006.01)

(52) U.S. Cl. ......................... 345/211; 345/100; 345/214

(58) Field of Classification Search ............ 345/87–102, 345/211–214

See application file for complete search history.

(56) References Cited

U.S. PATENT DOCUMENTS 5,248,963 A 9/1993 Yasui et al.
6,594,606 B2 7/2003 Everitt
6,621,489 B2 9/2003 Yanagisawa et al.

*Primary Examiner* — Bipin Shalwala
*Assistant Examiner* — Steven E Holton
(74) *Attorney, Agent, or Firm* — Robert J. Depke; Rockey, Depke & Lyons, LLC

(57) ABSTRACT

An active-matrix liquid crystal display device has pixels arranged in a matrix which each include a thin film transistor (TFT) as an active element. When the device is in a power-off state, TFTs in all the pixels are switched on, and all horizontal switches are turned on so that all data lines are supplied with a potential equal to the potential of common electrodes of the pixels. This forms a discharging path for discharging residual charge in all the pixels, and the discharging path can instantaneously discharge the residual charges.

3 Claims, 11 Drawing Sheets

LIQUID CRYSTAL DISPLAY DEVICE, METHOD FOR CONTROLLING THE SAME, AND PORTABLE TERMINAL

The subject matter of application Ser. No. 10/618,012 is incorporated herein by reference. The present application is a continuation of U.S. application Ser. No. 10/618,012, filed Jul. 11, 2003 now U.S. Pat. No. 7,271,801, which claims priority to Japanese Patent Application No. JP 2002-203440, filed Jul. 12, 2002. The present application claims priority to these previously filed applications.

BACKGROUND OF THE INVENTION

1. Field of the Invention

The present invention relates to liquid crystal display devices, methods for controlling the devices, and portable terminals, and in particular, to an active-matrix liquid crystal display device including active elements for pixels, a method for controlling the liquid crystal display device when it is in a power-off state, and a portable terminal in which the liquid crystal display device is used as a screen display unit.

2. Description of the Related Art

When a liquid crystal display device is switched off (in a power-off state), residual electric charge in pixels may cause a residual image forming distortions on the screen.

A method for shutting off the supply of power to a liquid crystal panel has been employed as a measure in the related art for preventing screen distortions occurring in the power-off state. In this method, in response to a power-off command issued when a user operates a power-on/off button, white data is written in all pixels in the case of a normally-white liquid crystal display device, or black data is written in all pixels in the case of a normally-black liquid crystal display device, whereby the pixels are controlled to display white or black so that screen distortions are eliminated. After that, by turning off a power-supply switch provided on a power-supply line, the supply of power to the liquid crystal panel is shut off.

In this method, writing of the white data or black data is sequentially performed in units of rows by a scanning operation, as in the case of ordinary writing of display data, and writing of the white data or black data for one screen requires a minimum of one field period. Thus, this method cannot cope with a sudden occurrence of the power-off state, which is an instantaneous event. The sudden occurrence of the power-off state includes, for example, a case in which a user mistakenly or deliberately removes a power-supply battery from a portable terminal (e.g., a cellular phone) whose screen display unit is a liquid crystal display device.

SUMMARY OF THE INVENTION

The present invention is made in view of the above problem, and it is an object of the present invention to provide a liquid crystal display device in which, by eliminating a residual image caused by residual electric charge in pixels even if a power-off state suddenly occurs, it is ensured that screen distortions in the power-off state can be prevented, a method for controlling the liquid crystal display device, and a portable terminal in which the liquid crystal display device is used as a screen display panel.

According to an aspect of the present invention, a liquid crystal display device is provided which includes a pixel section having pixels arranged in a matrix which include active elements, and signal lines connected to columns of pixels, a first control unit for switching on the active elements for all the pixels in the pixel section when the liquid crystal display device is in a power-off state, and a second control unit for setting, in the power-off state, all the signal lines to each have a potential equal to the potential of common electrodes of the pixels.

According to another aspect of the present invention, a liquid crystal display device is provided which includes a pixel section having pixels arranged in a matrix which include active elements, and signal lines connected to columns of pixels, and a selecting unit for selecting one of a first power-off mode and a second power-off mode in accordance with the type of power-off state of the liquid crystal display device. In the first power-off mode, in the power-off state, white level signals or black level signals are written in all the pixels while the pixels in the pixel section are first selected in a sequential manner in units of rows. In the second power-off mode, in the power-off state, the active elements for all the pixels in the pixel section are switched on and all the signal lines are set to each have a potential equal to the potential of common electrodes of the pixels.

According to another aspect of the present invention, a method for controlling a liquid crystal display device having pixels arranged in a matrix which include active elements, and signal lines connected to columns of pixels, is provided. The method includes the steps of switching on the active elements for all the pixels, and setting all the signal lines to each have a potential equal to the potential of common electrodes of the pixels.

According to another aspect of the present invention, a method for controlling a liquid crystal display device having pixels arranged in a matrix which include active elements, signal lines connected to columns of pixels, a power-off button, and a power-supply battery, is provided. The method includes the steps of, for a power-off state caused by operating the power-off button, writing white level signals or black level signal to all the pixels while first selecting the pixels in a sequential manner, and for a power-off state caused by removing the power-supply battery, switching on the active elements for all the pixels, and setting all the signal lines to each have a potential equal to the potential of common electrodes of the pixels.

According to another aspect of the present invention, a portable terminal including a liquid crystal display device used as a screen display unit is provided. The liquid crystal display device includes a pixel section having pixels arranged in a matrix which include active elements, and signal lines connected to columns of pixels, a first control unit for switching on the active elements for all the pixels in a power-off state, and a second control unit for setting, in the power-off state, all the signal lines to each have a potential equal to the potential of common electrodes of the pixels.

According to another aspect of the present invention, a portable terminal including a liquid crystal display device used as a screen display unit is provided. The liquid crystal display device includes a pixel section having pixels arranged in a matrix which include active elements, and signal lines connected to columns of pixels, and a selecting unit for selecting one of a first power-off mode and a second power-off mode in accordance with the type of power-off state. In the first power-off mode, in the power-off state, white level signals or black level signals are written in all the pixels while the pixels in the pixel section are first selected in a sequential manner in units of rows. In the second power-off mode, in the power-off state, the active elements for all the pixels in the pixel section are switched on and all the signal lines are set to each have a potential equal to the potential of common electrodes of the pixels.

According to the present invention, when a liquid crystal display device is in a power-off state, by switching on all the pixels of a pixel section of the liquid crystal display device, and setting all signal lines to each have a potential equal to the potential of common electrodes in all the pixels, a discharging path for discharging residual charge in all the pixels is formed, and the discharging path can instantaneously discharge the residual charges in all the pixels. Therefore, even if a power-off state suddenly occurs, it is ensured that screen distortions formed by a residual image caused by the residual charge in the pixels can be prevented.

DESCRIPTION OF THE PREFERRED EMBODIMENTS

Embodiments of the present invention are described below with reference to the accompanying drawings.

First Embodiment

Figure 1:
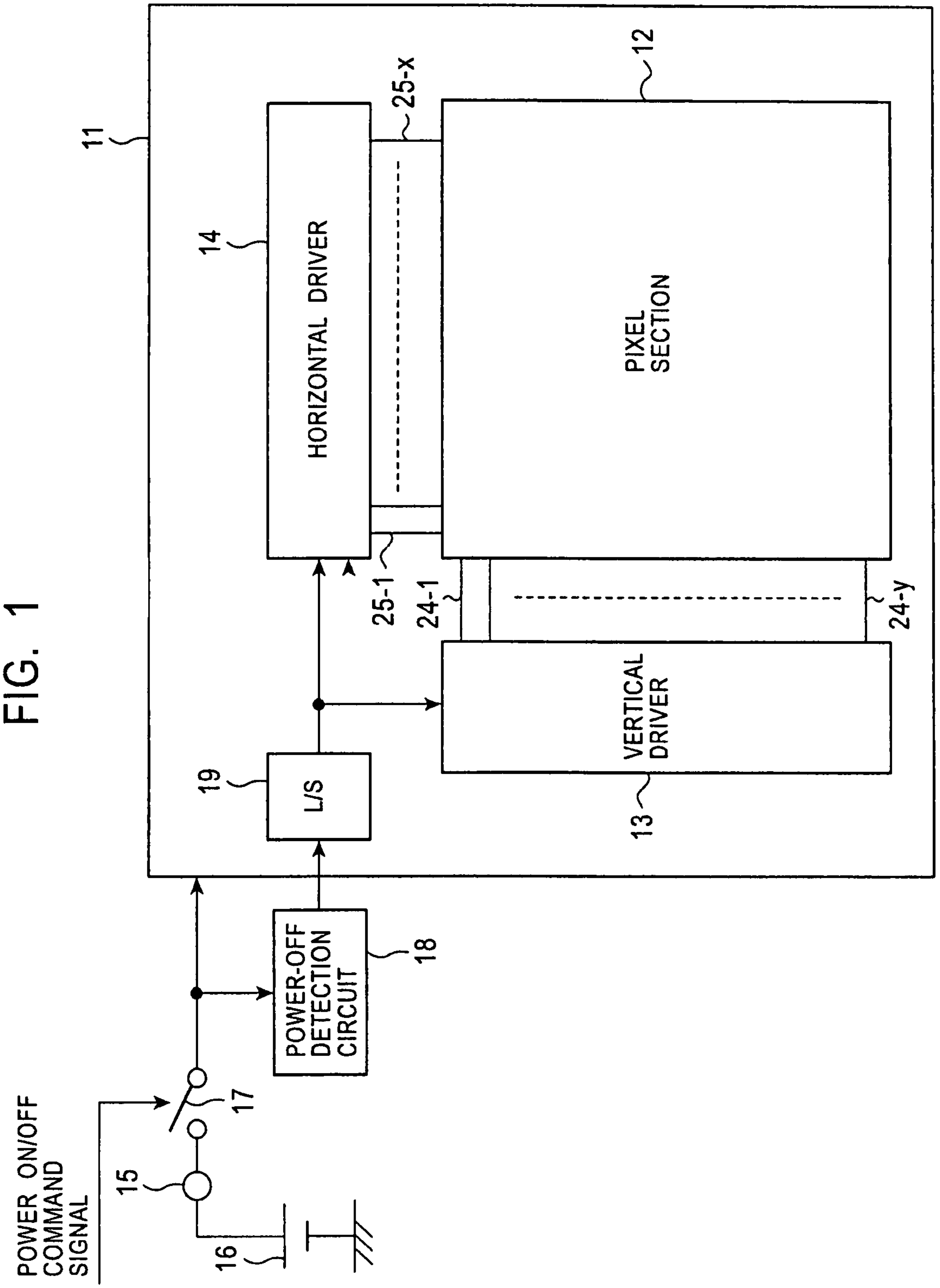
FIG. 1 is a block diagram showing a liquid crystal display device according to a first embodiment of the present invention.

FIG. 1 is a block diagram showing a liquid crystal display device according to a first embodiment of the present invention. The liquid crystal display device according to the first embodiment operates on the condition that it uses a battery as a power supply.

In FIG. 1, pixels including active elements are arranged in a matrix on a transparent insulating substrate (e.g., a glass substrate 11) to form an active matrix pixel section (display section) 12.

The glass substrate 11 is disposed opposing another glass substrate, with a predetermined distance provided therebetween. Both glass substrates have liquid crystal material therebetween to constitute a liquid crystal display panel (LCD panel).

Figure 2:
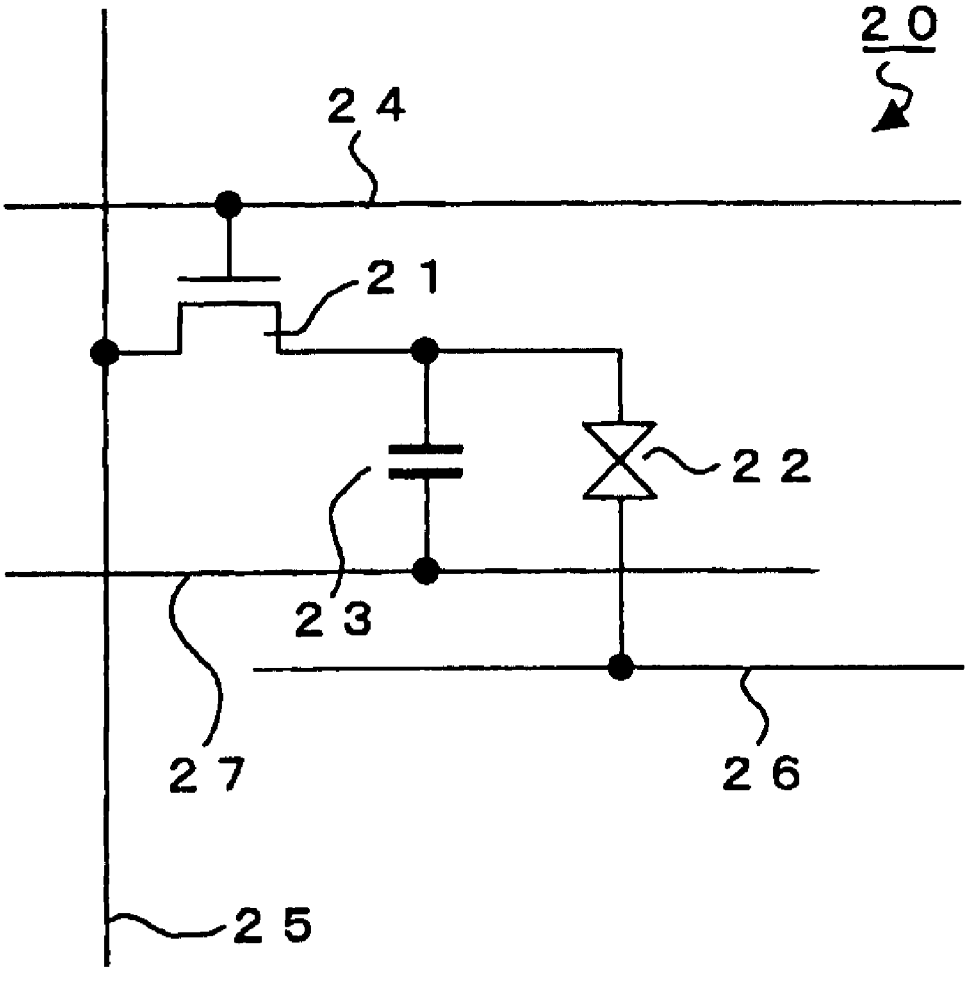
FIG. 2 is a circuit diagram showing each of pixels in a pixel section of the liquid crystal display device shown in FIG. 1.

An example of each pixel 20 in the pixel section 12 is shown in FIG. 2. The pixel 20 includes a pixel transistor 21 as an active element (e.g., a thin film transistor (TFT)), a liquid crystal cell 22 having a pixel electrode connected to the drain electrode of the TFT 21, and a storage capacitor 23 having one electrode connected to the drain electrode of the TFT 21. The liquid crystal cell 22 represents a liquid crystal capacitance generated between the pixel electrode and a common electrode formed opposing the pixel electrode.

In this pixel structure, the TFT 21 has a gate electrode connected to a gate line (scanning line) 24, and a source electrode connected to a data line (signal line) 25.

The common electrode in the liquid crystal cell 22 is connected in common to the pixels for a VCOM line 26. The common electrode in the liquid crystal cell 22 is supplied with a common voltage VCOM (VCOM potential) by the VCOM line 26. The supplied voltage is common to the pixels. The other electrode (a terminal on the side of the common electrode) in the storage capacitor 23 is connected to a CS line 27. This is common to the pixels.

Referring back to FIG. 1, a surface of the glass substrate 11 on which the pixel section 12 is formed has, for example, a vertical driver 13 on the left of the pixel section 12, and a horizontal driver 14 above the pixel section 12. These circuits are formed by using low temperature polysilicon or continuous grain polysilicon, together with the pixel transistors of the pixel section 12.

A battery terminal 15 is provided outside the glass substrate 11, and the battery terminal 15 is connected to a power-supply battery 16. An external power-supply voltage VCC from the power-supply battery 16 is supplied to the glass substrate 11 through a power-supply switch 17 provided on a power-supply line. The supplied voltage is increased to an internal power-supply voltage VDD by a DC-DC converter (not shown), and is supplied as circuit operating power to the circuits. The power-supply switch 17 performs an ON/OFF (close/open) operation in response to a power-ON/OFF command signal sent when a power-ON/OFF button (not shown) is operated by a user. The output side of the power-supply switch 17 is connected to a power-off detection circuit 18.

The power-off detection circuit 18 detects a power-off state occurring when the power-supply switch 17 is turned off, or the power-supply battery 16 is removed, by monitoring the level of a power-supply voltage (hereinafter referred to as an "external power-supply voltage") outside the panel which is supplied from the power-supply battery 16 through the power-supply switch 17. Regarding the power-off detection circuit 18, for example, a comparator circuit may be used which compares the external power-supply voltage with a predetermined reference voltage and outputs a power-off-state detection signal when the external power-supply voltage is not greater than the reference voltage.

The power-off-state detection signal output from the power-off detection circuit 18 is supplied to the glass substrate 11. The supplied signal is processed by a level shift circuit 19 (indicated by "L/S" in FIG. 1) provided in the glass substrate 11 so that its external power-supply voltage is shifted in level to a power-supply voltage (hereinafter referred to as an "internal power-supply voltage") in the panel, and is supplied as a control signal C1 to the vertical driver 13 and the horizontal driver 14.

The internal power-supply voltage includes two types, namely, the power-supply voltage VCC, which has a low voltage magnitude and is used as a power-supply voltage for operating a signal processing system, and the power-supply voltage VDD, which has a high voltage amplitude and is used as a power-supply voltage for operating a driver system.

In the above-described liquid crystal display device, which is of an active matrix type, in a normal display mode, the vertical driver 13 performs a vertical scanning operation by, for each column of pixels in the pixel section 12, sequentially selecting gate lines 24-1 to 24-y formed correspondingly to the number y of vertical pixels, and sequentially switching on the TFTs 21 (pixel transistors) in units of lines. The liquid crystal display device also has a first controller function that simultaneously switches on the TFTs 21 of all the pixels when the power-off state is detected by the power-off detection circuit 18.

In the normal display mode, the horizontal driver 14 can write a display signal in each pixel by supplying display signals to the pixels in the row selected by the vertical driver 13. The liquid crystal display device also has a second controller function that, when the power-off state is detected by the power-off detection circuit 18, supplies, to data lines (signal lines) 25-1 to 25-x formed correspondingly to the number x of horizontal pixels, a potential (e.g., a ground level) equal to that of the common electrode of the pixel 20. In the first embodiment, it is assumed in FIG. 2 that the potentials of the VCOM line 26 and the CS line 27 are zeroes in the power-off state.

Figure 3:
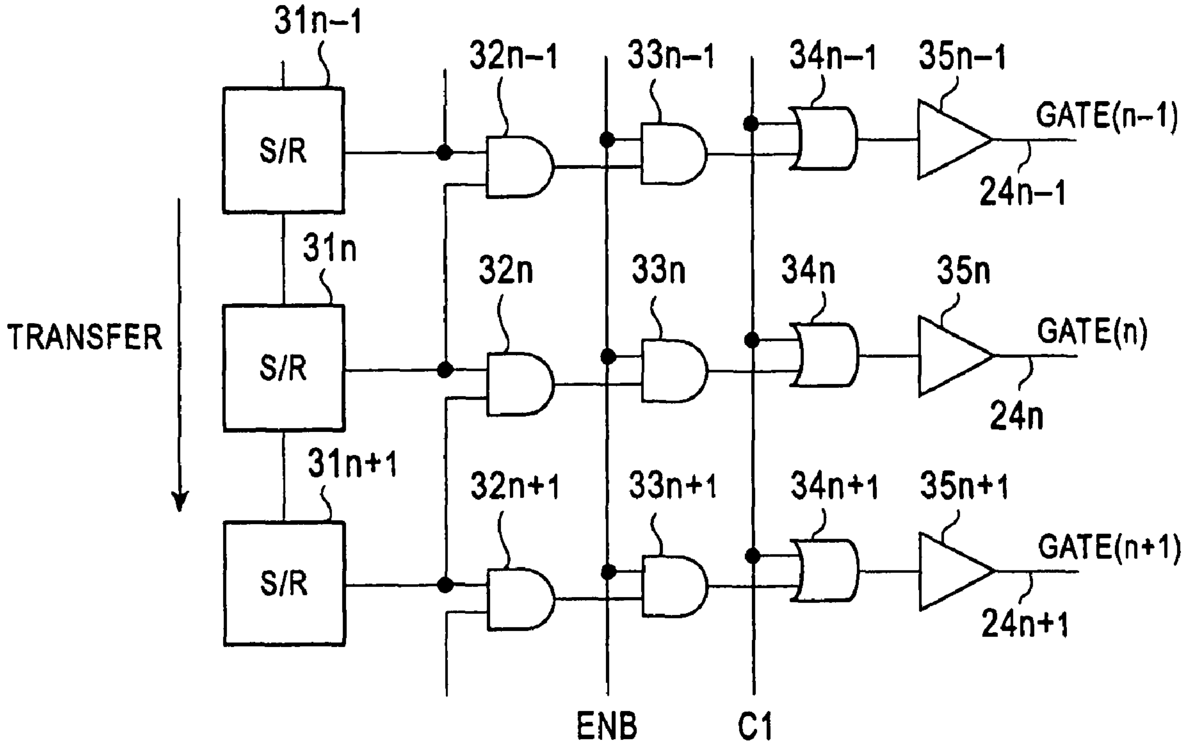
FIG. 3 is a block diagram showing a vertical driver in the liquid crystal display device shown in FIG. 1.

FIG. 3 is a block diagram showing an example of the vertical driver 13. In FIG. 3, for brevity of drawing, the structures of three intermediate stages n+1, n, and n+1 are only shown extracted.

In FIG. 3, a shift register 31n−1 in the stage n+1, a shift register 31n in the stage n, and a shift register 31n+1 in the stage n+1 are cascade-connected. An Output pulse from each of the shift registers 31n−1, 31n, and 31n+1 is supplied as one input to each of AND gates 32n−1, 32n, and 32n+1. Each of the AND gates 32n−1, 32n, and 32n+1 is supplied with an output pulse as the other input from each of next-stage shift registers 32n, 32n+1, and 32n+2. An output pulse from each of the AND gates 32n−1, 32n, and 32n+1 is supplied as one input to each of the AND gates 33n−1, 33n, and 33n+1.

Each of the AND gates 33n−1, 33n, and 33n+1 receives, as the other output, an enable pulse ENB for permitting row selection. An output pulse from each of the AND gates 33n−1, 33n, and 33n+1 is supplied as one input to each of OR gates 34n−1, 34n, and 34n+1. Each of the OR gates 34n−1, 34n, and 34n+1 receives, as the other input, the control signal C1 output when the power-off state is detected by the power-off detection circuit 18. An output pulse from each of the OR gates 34n−1, 34n, and 34n+1 is supplied as a scanning pulse (gate pulse) to each of gate lines 24n−1, 24n, and 24n+1 through each of buffers 35n−1, 35n, and 35n+1.

Figure 4:
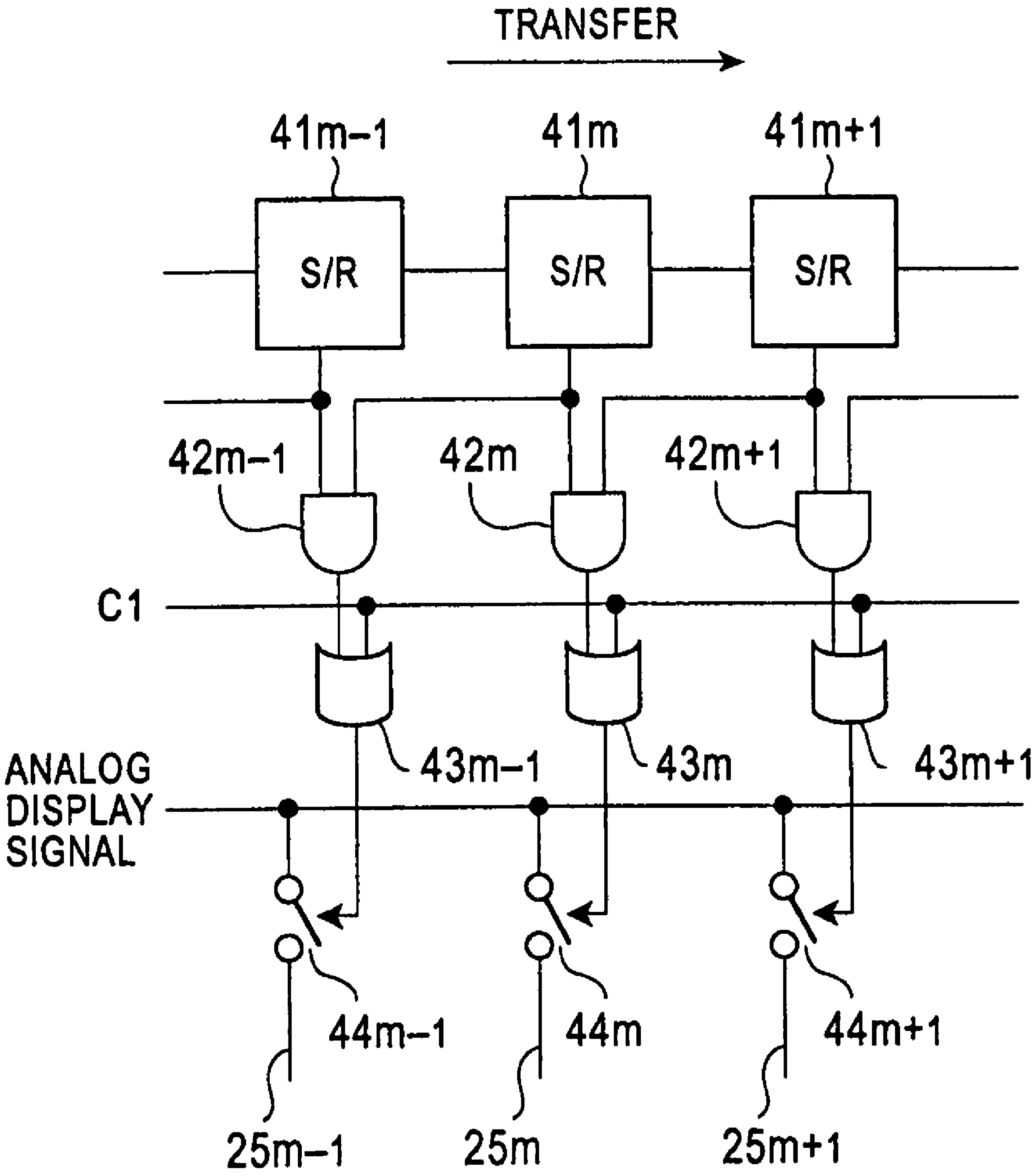
FIG. 4 is a block diagram showing a horizontal driver in the liquid crystal display device shown in FIG. 1.

FIG. 4 is a block diagram showing an example of the horizontal driver 14. In FIG. 4, for brevity of drawing, the structures of three intermediate stages m+1, m, and m+1 are only shown extracted.

In FIG. 4, a shift register 41m−1 in the stage m+1, a shift register 41m in the stage m, and a shift register 41m+1 in the stage m+1 are cascade-connected. An output pulse from each of the shift registers 41m+1, 41m, and 41m+1 is supplied as one input to each of AND gates 42m+1, 42m, and 42m+1. Each of the AND gates 42m+1, 42m, and 42m+1 receives, as the other input, an output pulse from each of next-stage shift registers 41m, 41m+1, and 41m+2. An output pulse from each of the AND gates 42m+1, 42m, and 42m+1 is supplied as one input to each of OR gates 43m+1, 43m, and 43m+1.

Each of the OR gates 43m+1, 43m, and 43m+1 receives, as the other input, the control signal C1 output when the power-off state is detected by the power-off detection circuit 18. An output pulse from each of the OR gates 43m−1, 43m, and 43m+1 is supplied as an ON/OFF control pulse to each of horizontal switches 44m+1, 44m, and 44m+1. Each of the horizontal switches 44m+1, 44m, and 44m+1 is connected between a signal input line 45 for conducting an analog display signal and one end of each of data lines 25m+1, 25m, and 25m+1 in the pixel section 12, and is sequentially turned on (closed) when being supplied with an output pulse from each of the OR gates 43m+1, 43m, and 43m+1, whereby the analog display signal is supplied to each of the data lines 25m+1, 25m, and 25m+1.

Figure 5:
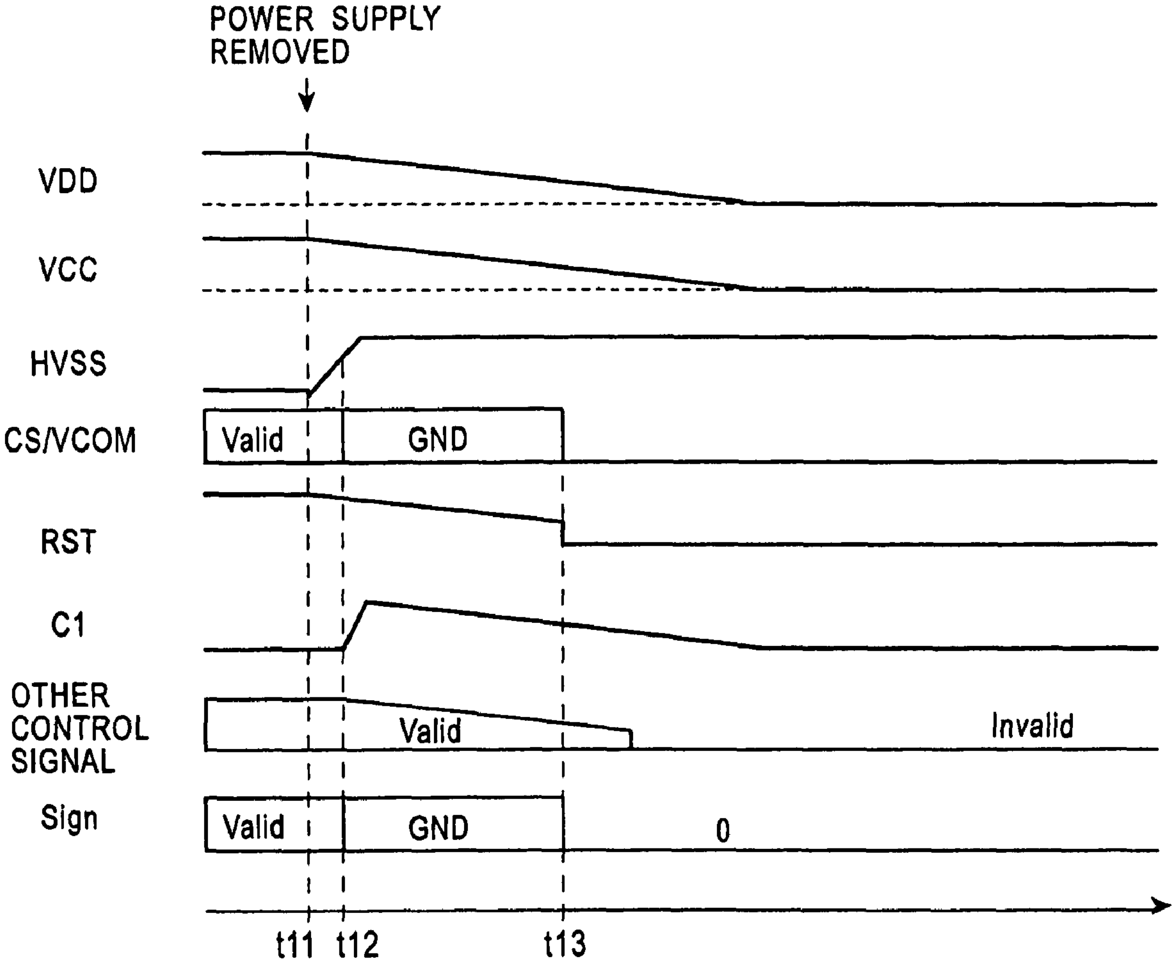
FIG. 5 is a timing chart illustrating the operation of the liquid crystal display device (first embodiment) shown in FIG. 1.

Next, in the liquid crystal display device, in the normal display mode, vertical scanning, performed by the vertical driver 13, selects the pixels in the pixel section 12 in units of rows, and horizontal scanning performed by the horizontal driver 14 sequentially selects the horizontal switches 44m+1, 44m, and 44m+1, whereby the analog display signal is written in each pixel in a row selected by the vertical driver 13 in a point-at-a-time manner. The vertical driver 13 and the horizontal driver 14 perform control in the power-off state, in addition to control of the writing in the normal display mode. In this embodiment, regarding a case in which a sudden occurrence of the power-off state, for example, a power-off state caused by removing the power-supply battery 16, a control process in the case is described below with reference to the timing chart shown in FIG. 5. When the user removes the power-supply battery 16, for example, mistakenly or deliberately, the power-supply voltages VDD and VCC gradually decrease over time from time t11 at which the power-supply battery 16 is removed. Then, a drop in the external power-supply voltage causing the power-supply voltages VDD and VCC, that is, in this case, a rise in a negative power-supply voltage HVSS based on the external power-supply voltage, is monitored by the power-off detection circuit 18. At time t12 at which the negative power-supply voltage HVSS is equal to or less than a predetermined reference voltage, the power-off detection circuit 18 outputs and supplies a power-off detection signal as a control signal C1 to the vertical driver 13 and the horizontal driver 14 through the level shift circuit 19.

In response to the control signal C1, the vertical driver 13 switches on the TFTs 21 in all the pixels in the pixel section 12. Simultaneously, the horizontal driver 14 switches on all horizontal switches 44-1 to 44-x. In other words, as is clear from the circuit diagrams in FIGS. 3 and 4, the control signal C1 passes through the OR gates 34n−1, 34n, and 34n+1, and is simultaneously supplied to the gate lines 24n−1, 24n, and 24n+1 through the buffers 35n−1, 35n, and 35n+1. The control signal C1 also passes through the OR gates 43m+1, 43m, and 43m+1, and is simultaneously supplied to the horizontal switches 44m+1, 44m, and 44m+1.

At this time, the horizontal driver 14 sets the potential of the signal input line 45 to the ground level on condition that the potentials (common electrode potential) of the VCOM line 26 and the CS line 27 are set to the ground level. As a result, the potentials of the gate lines 24n−1, 24n, and 24n+1 are also set to the ground level. In other words, in the power-off state, the potentials of the gate lines 24n−1, 24n, and 24n+1 are set to a value equal to the common electrode potential of the pixel 20.

This forms, for the all the pixels in the pixel section 12, a discharging path-constituted by the pixel electrodes, the TFTs 21, the data line 25, the horizontal switch 44, the signal input line 24, and the common electrode in the order given. As a result, residual charge in all the pixels in the pixel section 12, that is, charge remaining in each liquid crystal cell 22 and each storage capacitor 23, are instantaneously discharged by the discharging path. Also the level of the control signal C1 gradually decreases as the power-supply voltage decreases. At time t13 at which the level of the control signal C1 decreases to a predetermined voltage, a system reset pulse RST in the panel which has gradually decreased in level with a decrease in the power-supply voltage disappears.

As described above, in the liquid crystal display device composed of the pixels in the pixel section 12 which each include a pixel transistor, for example, the TFT 21 as an active element, in the power-off state, the TFTs in all the pixels in the pixel section 12 are simultaneously switched on, and each horizontal switch 44 is simultaneously switched on so that all the data lines 25-1 to 25-x are each supplied with a potential equal to the common electrode potential, whereby a discharging path for residual charge in all the pixels is formed. Thus, the residual charge in all the pixels is instantaneously discharged by the discharging path.

This can discharge the residual charge in all the pixels, even if a power-off state suddenly occurs, specifically, a power-off state caused such that the user removes the power-supply battery 16, for example, mistakenly or deliberately. Accordingly, a residual image caused by the residual charge can be eliminated, thus ensuring the prevention of screen distortions. Not only for the sudden occurrence of the power-off state, but also for a normal power-off state caused by the OFF state of the power-supply switch 17 when the user operates the power ON/OFF button, similar operation and advantages can be obtained.

Although the first embodiment describes a case in which the present invention is applied to the horizontal driver 14, which employs a point-at-a-time driving method, the present invention is not limited to the first embodiment, and may be applied to a selector driving horizontal driver. In the selector driving method, one-to-X (X represents a positive integer) correspondence is established between each output end of a driver IC provided outside the LCD panel and data lines (signal lines) on the LCD panel, and X data lines assigned to one output end of the driver IC are selectively driven in a divided-by-X time-division manner. By employing the selector driving method, the number of outputs of the driver IC and the number of wires between the driver IC and the LCD panel can be reduced to 1/X of the number of data lines.

Figure 6:
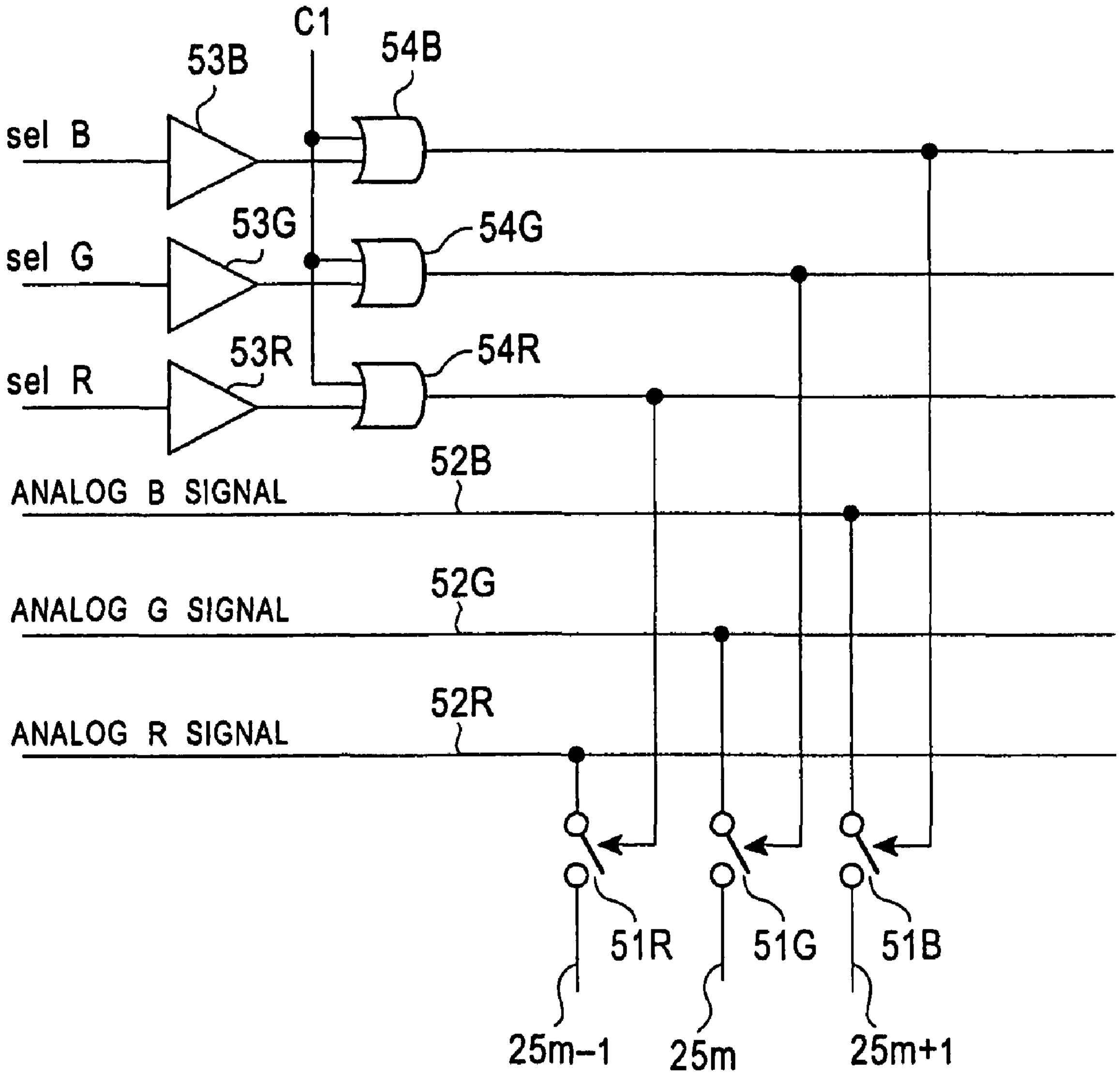
FIG. 6 is a block diagram showing another example of the horizontal driver shown in FIG. 4 in which a selector driving method is employed.

An example of the circuit of the selector driving horizontal driver is shown in FIG. 6. FIG. 6 shows the case of divided-by-three time divisions (X=3) corresponding to red (R), green (G), and blue (B). Each of three RGB selection switches 51R, 51G, and 51B is connected between each of three RGB signal input lines 52R, 52G, and 52B, and each of data lines 25m+1, 25m, and 25m+1, with the selection switches 51R, 51G, and 51B as a unit. In the normal display mode, the selection switches 51R, 51G, and 51B are sequentially turned on in response to selection signals “sel R”, “sel G”, and “sel B” which are supplied through buffers 53R, 53G, and 53B, and OR gates 54R, 54G, and 54B. In the power-off state, the selection switches 51R, 51G, and 51B are simultaneously turned on in response to control signals C1 supplied through the OR gates 54R, 54G, and 54B. Accordingly, in the power-off state, for all the pixels in the pixel section 12, a discharging path constituted by the pixel electrode, the TFT 21, the data line 25, the selection switches 51R, 51G, and 51B, the signal input lines 52R, 52G, and 52B, and the common electrode in the order given, and residual charge in all the pixels in the pixel section 12 is instantaneously discharged through the discharging path. In other words, also in the case of the selector driving horizontal driver, operation and advantages similar to those in the case of the point-at-a-time driving method can be obtained.

Second Embodiment

Figure 7:
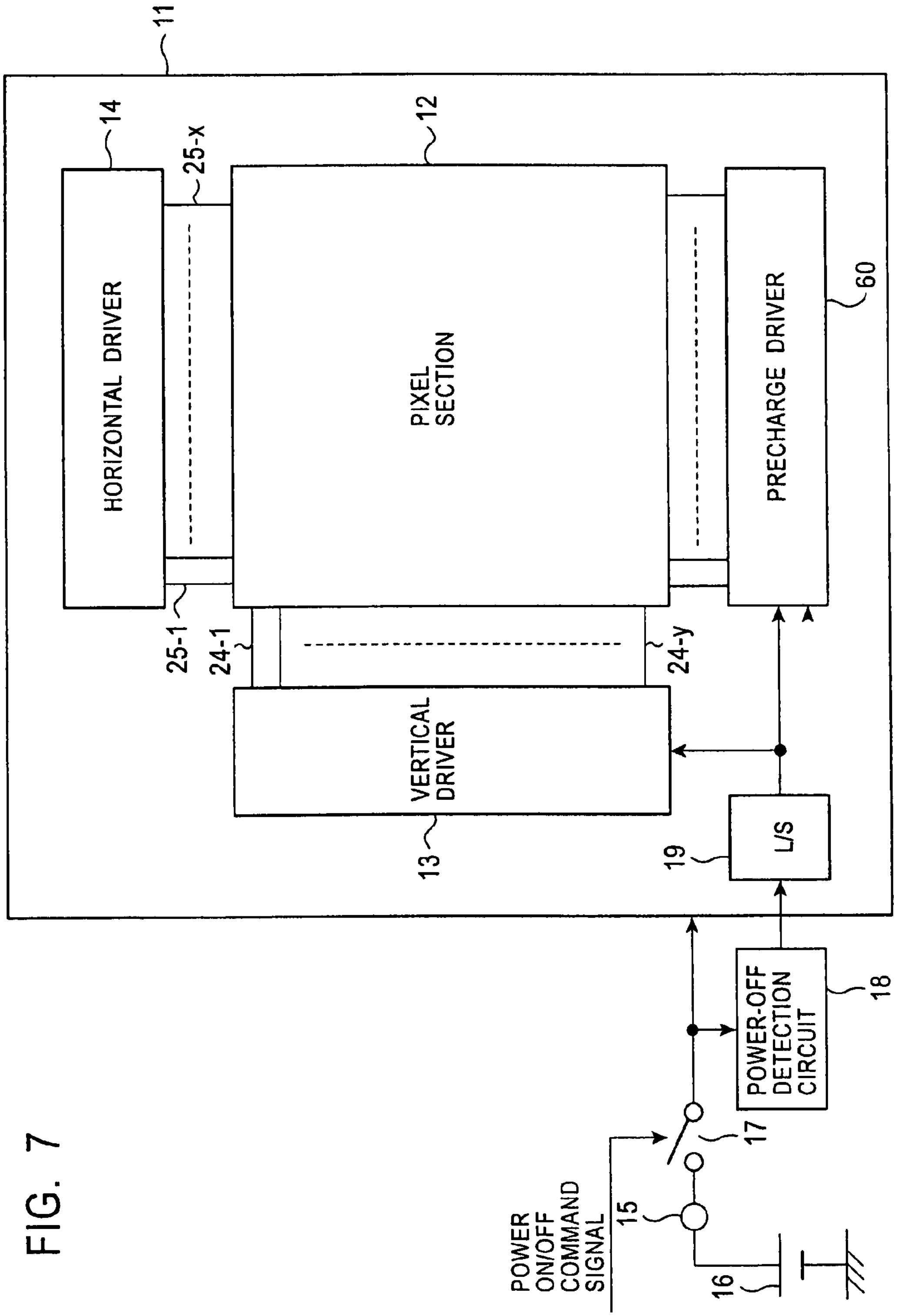
FIG. 7 is a block diagram showing a liquid crystal display device according to a second embodiment of the present invention.

FIG. 7 is a block diagram showing a liquid crystal display device according to a second embodiment of the present invention. In the second embodiment, the present invention is applied to a precharging active matrix liquid crystal display device. In FIG. 7, portions equivalent to those in FIG. 1 are denoted by identical reference numerals. The liquid crystal display device according to the second embodiment is also based on the condition that it uses a battery as a power supply.

The liquid crystal display device according to the second embodiment includes a precharging driver 60 for writing a precharging signal Psig before a horizontal driver 14 writes display signals in data lines 25-1 to 25-x, in addition to the components according to the first embodiment. Regarding the precharging signal Psig, for example, in a normally-white liquid crystal display device, a gray or black level is used as a signal level.

Operation and advantages obtained by precharging are described below.

When an analog point-at-a-time liquid crystal display device does not first perform precharging, a case in which the precharging signal Psig is not written in the data lines 25-1 to 25-x before writing of a display signal is considered. For example, when known 1H inversion driving (H represents a horizontal period) is performed, a large charging/discharging current, generated by signal writing to the data lines 25-1 to 25-x, causes noises (e.g., vertical lines) on the display screen. Conversely, by writing the gray or black level signal (in the normally white mode) as the precharging signal Psig in the data lines 25-1 to 25-x beforehand, a charging/discharging current, generated by signal writing, can be suppressed, thus reducing the noise.

In the liquid crystal display device according to the second embodiment, the precharging driver 60 also has a second controller function that, when a power-off state is detected by a power-off detection circuit 18, supplies all the data lines 25-1 to 25-x with a potential equal to the common electrode potential of the pixel 20, for example, the ground level. In the second embodiment, it is assumed in FIG. 2 that the potentials of the VCOM line 26 and the CS line 27 are set to zeroes in the power-off state.

Figure 8:
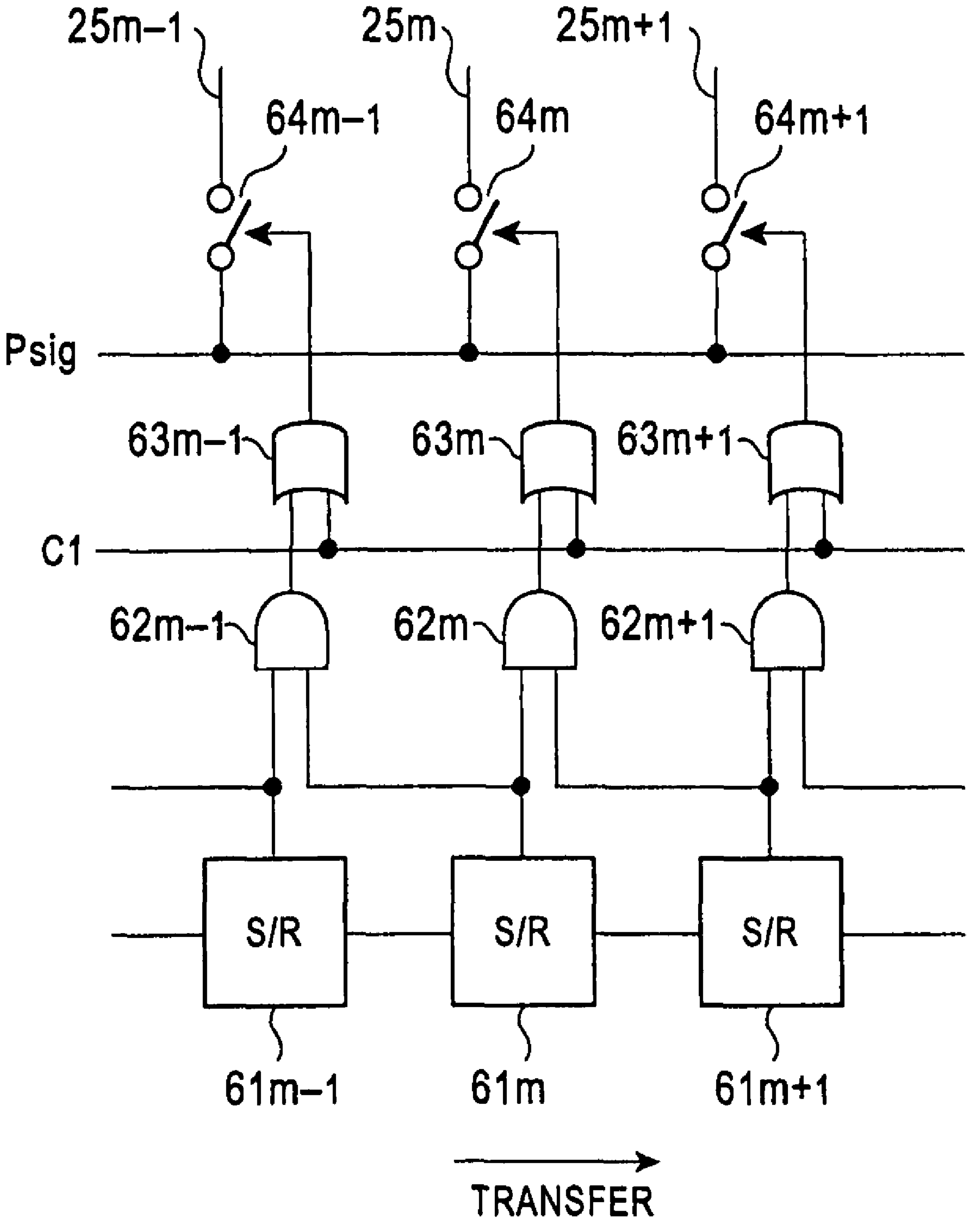
FIG. 8 is a block diagram showing an example of a precharging driver.

FIG. 8 is a block diagram showing the precharging driver 60. For brevity of drawing, three intermediate stages m+1, m, and m+1 are only shown extracted.

In FIG. 8, a shift register (indicated by “S/R”) 61m−1 in the stage m+1, a shift register 61m in the stage m, and a shift register 61m+1 in the stage m+1 are cascade-connected. An output pulse from each of the shift registers 61m+1, 61m, and 61m+1 is supplied as one input to each of AND gates 62m−1, 62m, and 62m+1. Each of the AND gates 62m+1, 62m, and 62m+1 receives, as the other input, an output pulse from each of next-stage shift registers 61m, 61m+1, and 61m+2. An output pulse from each of the AND gates 62m+1, 62m, and 62m+1 is supplied as one input to each of OR gates 63m+1, 63m, and 63m+1.

Each of the OR gates 63m+1, 63m, and 63m+1 receives, as the other input, the control signal C1 generated when the power-off state is detected by the power-off detection circuit 18. The output pulses from the OR gates 63m+1, 63m, and 63m+1 are supplied as ON/OFF control pulses to precharging switches 64m+1, 64m, and 64m+1, respectively. Each of the precharging switches 64m+1, 64m, and 64m+1 is connected between a signal input line 65 for conducting a precharging signal Psig and one end of each of the data lines 25m+1, 25m, and 25m+1. The precharging switches 64m−1, 64m, and 64m+1 are sequentially turned on (closed) when being supplied with the output pulses from the OR gates 63m−1, 63m, and 63m+1, and supply the precharging signal Psig to the data lines 25m+1, 25m, and 25m+1.

In the above liquid crystal display device including the precharging driver 60, when the power-off state is caused such that the user removes the power-supply battery 16, for example, mistakenly or deliberately, the power-off state is detected by the power-off detection circuit 18, and a power-off detection signal representing the power-off state is supplied as the control signal C1 to the vertical driver 13 and the precharging driver 60 through a level shift circuit 19 (indicated by "L/S").

In response to the control signal C1, the vertical driver 13 switches on the TFTs of all the pixels in the pixel section 12, and the precharging driver 60 simultaneously turns on all the precharging switches 64-1 to 64-x. At this time, on the condition that the potentials (the common electrode potential) of the VCOM line 26 and CS line 27 shown in FIG. 2, the precharging driver 60 sets the potential of the signal input line 65 to the ground level. As a result, also the potentials of the gate lines 24n−1, 24n, and 24n+1 are set to the ground level.

In other words, in the power-off state, the potentials of the gate lines 24n−1, 24n, and 24n+1 are set to a value equal to the pixel electrode potential of the pixel 20. This forms, for all the pixels in the pixel section 12, a discharging path constituted by the pixel electrode, the TFT 21, the data line 25, the precharging switches 64-1 to 64-x, the signal input line 65, and the common electrode in the order given. As a result, the discharging path instantaneously discharges charge which remains in the liquid crystal cell 22 and the storage capacitor 23 based on residual charge in all the pixels in the pixel section 12, that is, adjacently used writing data.

As described above, in the precharging active-matrix liquid crystal display device, by simultaneously switching on the TFTs of all the pixels in the pixel section 12, and simultaneously turning on all the precharging switches 64-1 to 64-x so that all the pixels in the pixel section 12 are supplied with a potential equal to the common electrode potential, whereby the discharging path for discharging residual charge is formed for all the pixels in the pixel section 12. Thus, the residual charge can be instantaneously discharged by the discharging path.

This can discharge the residual charge in all the pixels, even if a power-off state suddenly occurs, specifically, a power-off state caused such that the user removes the power-supply battery 16, for example, mistakenly or deliberately. Accordingly, a residual image caused by the residual charge can be eliminated, thus ensuring the prevention of screen distortions. Not only for the sudden occurrence of the power-off state, but also for a normal power-off state activated by the OFF state of the power-supply switch 17 when the user operates the power ON/OFF button, similar operation and advantages can be obtained.

In the second embodiment, instead of the horizontal switches 44m+1, 44m, and 44m+1 in the first embodiment, the precharging switches 64-1 to 64-x are used as means of supplying all the data lines 25-1 to 25-x with a potential equal to the pixel electrode potential in the power-off state. However, in the case of a liquid crystal display device including test switches corresponding to data lines 25-1 to 25-x in which, in order that a panel display test can be performed with the horizontal driver 14 not mounted, the test switches capture and supply test signals to the data lines 25-1 to 25-x, the test switches may be used.

Third Embodiment

Figure 9:
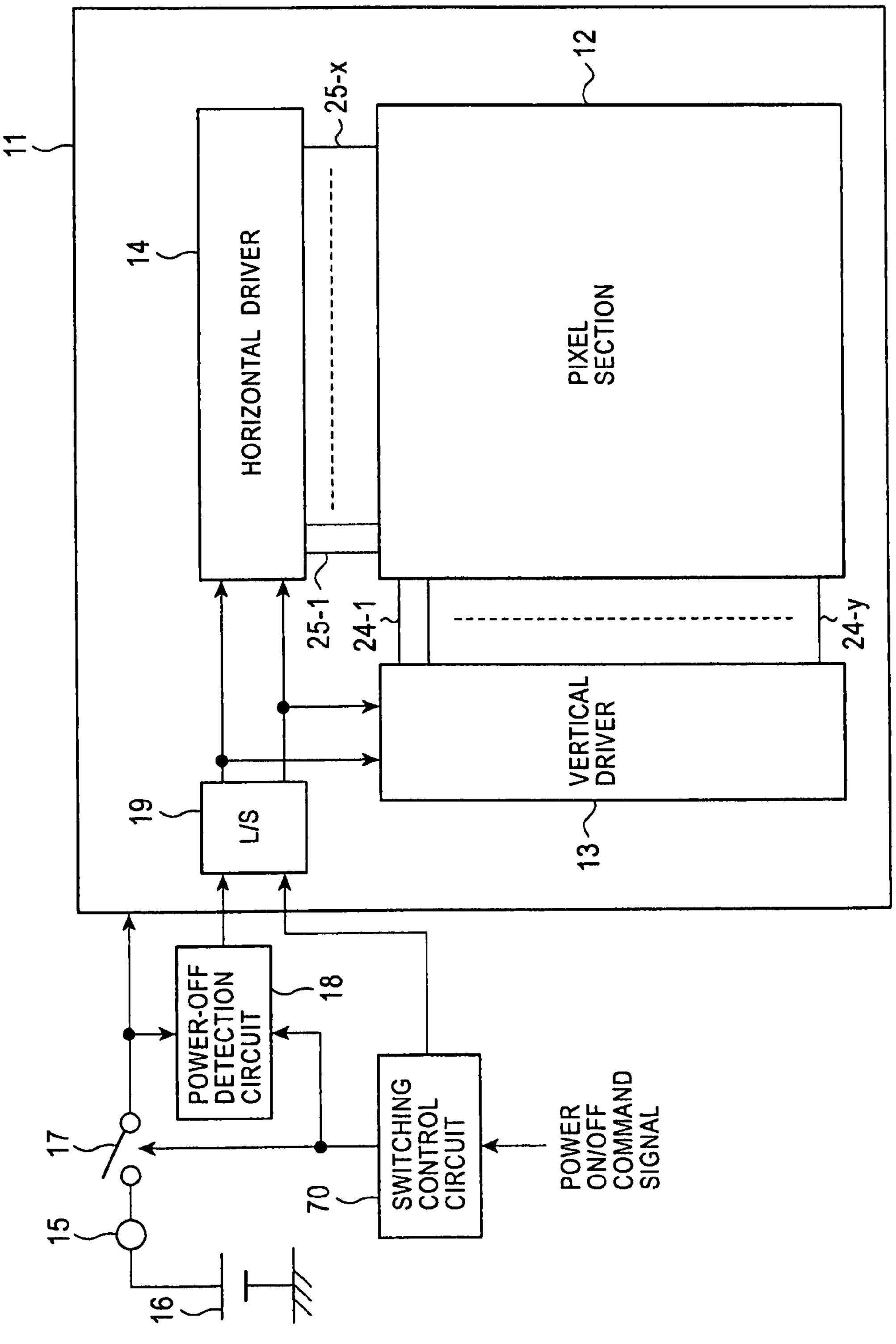
FIG. 9 is a block diagram showing a liquid crystal display device according to a third embodiment of the present invention.

FIG. 9 is a block diagram showing an active-matrix liquid crystal display device according to a third embodiment of the present invention. In FIG. 9, portions equivalent to those in FIG. 1 are denoted by identical reference numerals. The liquid crystal display device according to the third embodiment is based on the condition that it uses a battery 16 as a power supply.

The liquid crystal display device according to the second embodiment has a first power-off mode and a second power-off mode. In the first power-off mode, in the power-off state, white level signals are written in all the pixels in the pixel section 12 in the case of the normally white mode, and black level signals are written in all the pixels in the pixel section 12 in the normally black mode, with pixels in the pixel section 12 sequentially selected in units of rows. In the second power-off mode, in the power-off state, the active elements of all the pixels in the pixel section 12 are switched on and all the data lines are set to each have a potential equal to the common electrode potential. The liquid crystal display device can select one of the first and second power-off modes in accordance with a type of power-off state.

The power-off state includes two types, that is, a normal power-off state caused by a power-supply switch 17 turned off when the user operates the power ON/OFF button, and a power-off state suddenly caused such that the user removes the power-supply battery 16, for example, mistakenly or deliberately. In the former type of power-off state, the first power-off mode is selected, while in the latter type of power-off state, the second power-off mode is selected.

The structure and operation of the liquid crystal display device according to the third embodiment are described below.

The active-matrix liquid crystal display device according to the third embodiment includes a switching control circuit 70 in addition to the components according to the first embodiment. A power ON/OFF command signal, sent when the user operates a power ON/OFF button (not shown), is input to the switching control circuit 70. In response to the power ON/OFF command signal, the switching control circuit 70 controls the power-supply switch 17 to be turned on/off. The switching control circuit 70 also has a selecting means function for selecting a power-off mode. Specifically, when receiving a power OFF command signal, the switching control circuit 70 switches off the power-off detection circuit 18, outputs a first mode designating signal for commanding selection of the first power-off mode, and turns of the power-supply switch 17 after a predetermined time passes. The first mode designating signal, output from the switching control circuit 70, is level-shifted by the level shift circuit 19, and is supplied as a control signal C2 to the vertical driver 13 and the horizontal driver 14.

When the first power-off mode is selected by the switching control circuit 70, the power-off detection circuit 18 is switched off and does not perform an operation of detecting the power-off state. In another case, that is, a suddenly occurring power-off state, the power-off detection circuit 18 performs the detecting operation, and outputs a power-off detection signal when detecting the power-off state. The power-off detection signal serves as a second mode designating signal for commanding selection of the second power-off mode. The second mode designating signal, output from the switching control circuit 70, is level-shifted by the level shift circuit 19, and is supplied as a control signal C1 to the vertical driver 13 and the horizontal driver 14.

When the first power-off mode is selected, the vertical driver 13 and the horizontal driver 14 perform a normal display operation in a minimum of one field. Display signals which are written in the display operation are white signals in the case of the normally white mode, and are black signals in the case of the normally black mode. Specifically, in the first power-off mode, the vertical driver 13 initiates vertical scanning by using the control signal C2 as a shift register start signal, and performs the vertical scanning in a minimum of one field. The horizontal driver 14 initiates horizontal scanning by using the control signal C2 as a shift register start signal, and performs an operation of writing white or black signals in a point-at-a-time manner in pixels in rows which are sequentially selected by the vertical driver 13.

Figure 10:
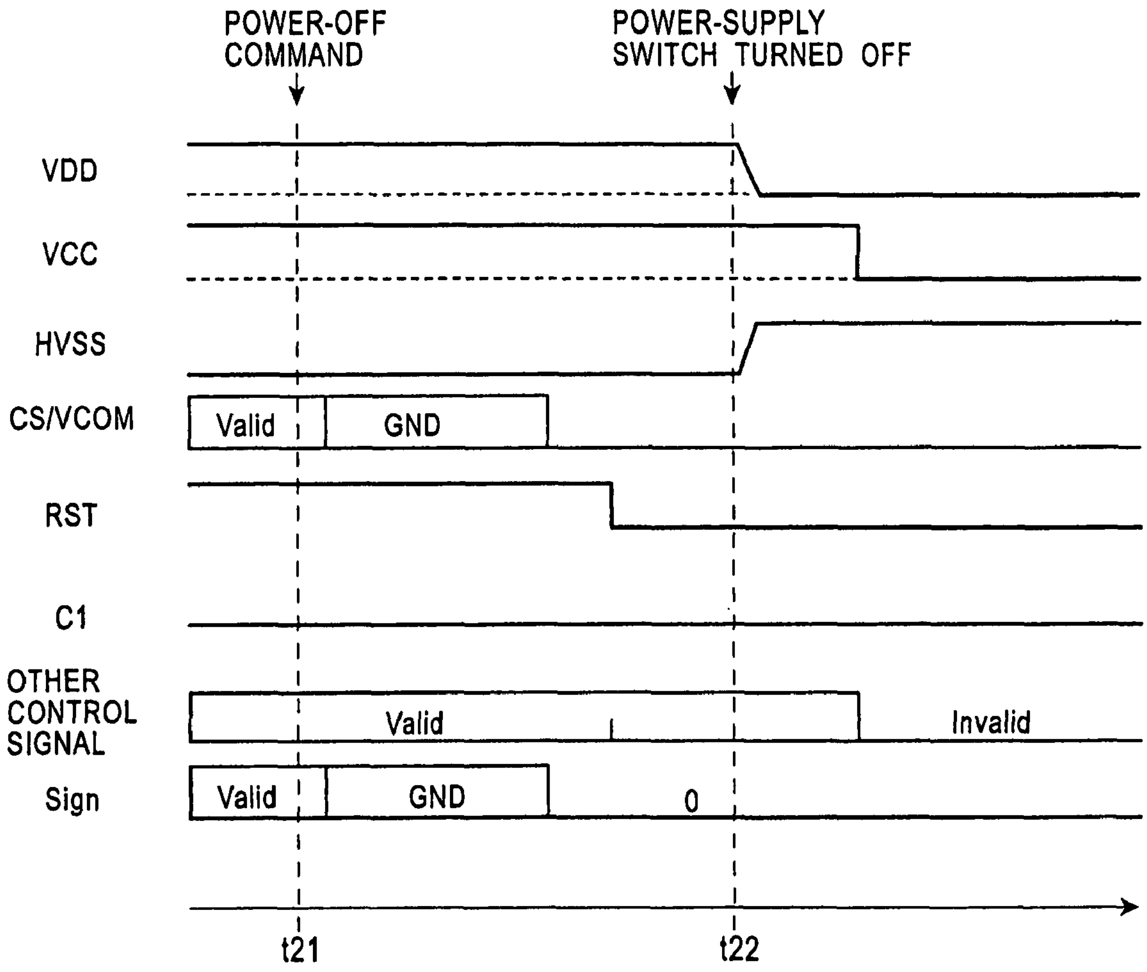
FIG. 10 is a timing chart illustrating the operation of the liquid crystal display device (third embodiment) shown in FIG. 9 when it is in a power-off state.

In other words, consecutive power-off processing is performed. In the processing, in the first power-off mode, as indicated by the timing chart shown in FIG. 10, at time t21 at which the power-off command signal is output when the user operates the power ON/OFF button, under control in accordance with the control signal C2 based on the first mode designating signal output from the switching control circuit 70, the pixels display white in the case of the normally white mode, and display black in the case of the normally black mode, whereby screen distortions are eliminated. The switching control circuit 70 turns off the power-supply switch 17 at time t22 at which the predetermined time has passed, whereby power supply to the LCD panel is shut off. The predetermined time requires the time of a minimum of one field in order for the pixels to display white or black. Thus, a time equal to or more than one field period must be set.

Conversely, when the second power-off mode is selected, the vertical driver 13 and the horizontal driver 14 perform processing similar to that in the first embodiment. In other words, in response to the control signal C1, the vertical driver 13 switches on the TFTs (pixel transistors) of all the pixels in the pixel section 12, and simultaneously turns of all horizontal switches 44-1 to 44-x. At this time, on the condition that the potentials (common electrode potential) of the VCOM line 26 and CS line 27 shown in FIG. 2 are set to the ground level, the horizontal driver 14 sets the potential of the signal input line 45 to the ground level. As a result, the gate lines 24n−1, 24n, and 24n+1 are set to each have a potential at the ground level.

In other words, in the power-off state, the potentials of the gate lines 24n−1, 24n, and 24n+1 are set to a value equal to the common electrode potential of the pixel 20. This forms, for all the pixels in the pixel section 12, a discharging path constituted by the pixel electrode, the TFT 21, the data line 25, the horizontal switches 44, the signal input line 24, and the common electrode in the order given. As a result, the discharging path instantaneously discharges charge which remains in the liquid crystal cell 22 and the storage capacitor 23 based on residual charge in all the pixels in the pixel section 12, that is, adjacently used writing data. Therefore, screen distortions caused by the residual charge in the pixels can be prevented beforehand.

The first power-off mode requires a minimum of the time of one field period for a scanning operation, though no large current flows in the liquid crystal display device when it performs the normal scanning operation. In the second power-off mode, a large instantaneous current flows in the liquid crystal display device in order to instantaneously discharge the residual charge in all the pixels, though the period of discharging the residual charge is very short.

As described above, the liquid crystal display device according to the third embodiment has the first power-off mode in which, in the power-off state, white level signals are written in all the pixels in the pixel section 12 in the case of the normally white mode, and black level signals are written in all the pixels in the pixel section 12 in the normally black mode, with pixels in the pixel section 12 sequentially selected in units of rows, and the second power-off mode in which, in the power-off state, the active elements of all the pixels in the pixel section 12 are switched on and all the data lines are set to each have a potential equal to the common electrode potential. This enables the liquid crystal display device to selectively use the two modes in accordance with the type of the power-off state.

In other words, in the normal power-off state caused by the power-supply switch 17 turned off when the user operates the power ON/OFF switch, the first power-off mode is selected. In the power-off state, by first controlling the pixels to display while or black, and subsequently shutting off the power supply to the LCD panel, it is ensured that reduced power consumption can prevent screen distortions formed by a residual image caused by residual charge in the pixels.

In addition, when a power-off state is suddenly caused such that the user removes a power-supply battery, for example, mistakenly or deliberately, by selecting the second power-off mode to form, for all the pixels, a discharging path for discharging residual charge in the power-off state, the residual charge in the pixels can be instantaneously discharged by the discharging path. Thus, it is ensured that screen distortions formed by the residual charge can be prevented. Although, in this case, a large instantaneous current flows in the liquid crystal display device, a sudden occurrence of the power-off state is extremely rare. Thus, normal power consumption of the liquid crystal display device is not greatly affected.

The third embodiment has been described on the condition that horizontal switches are used as means of supplying all the data lines 25-1 to 25-x with a potential equal to the common electrode potential of the pixel 20, similarly to the first embodiment. However, the present invention may be applied to the case of using precharging switches as in the second embodiment.

The liquid crystal display devices according to the first to third embodiments are suitable for use as screen display units in portable terminals such as cellular phones and portable digital assistants.

Figure 11:
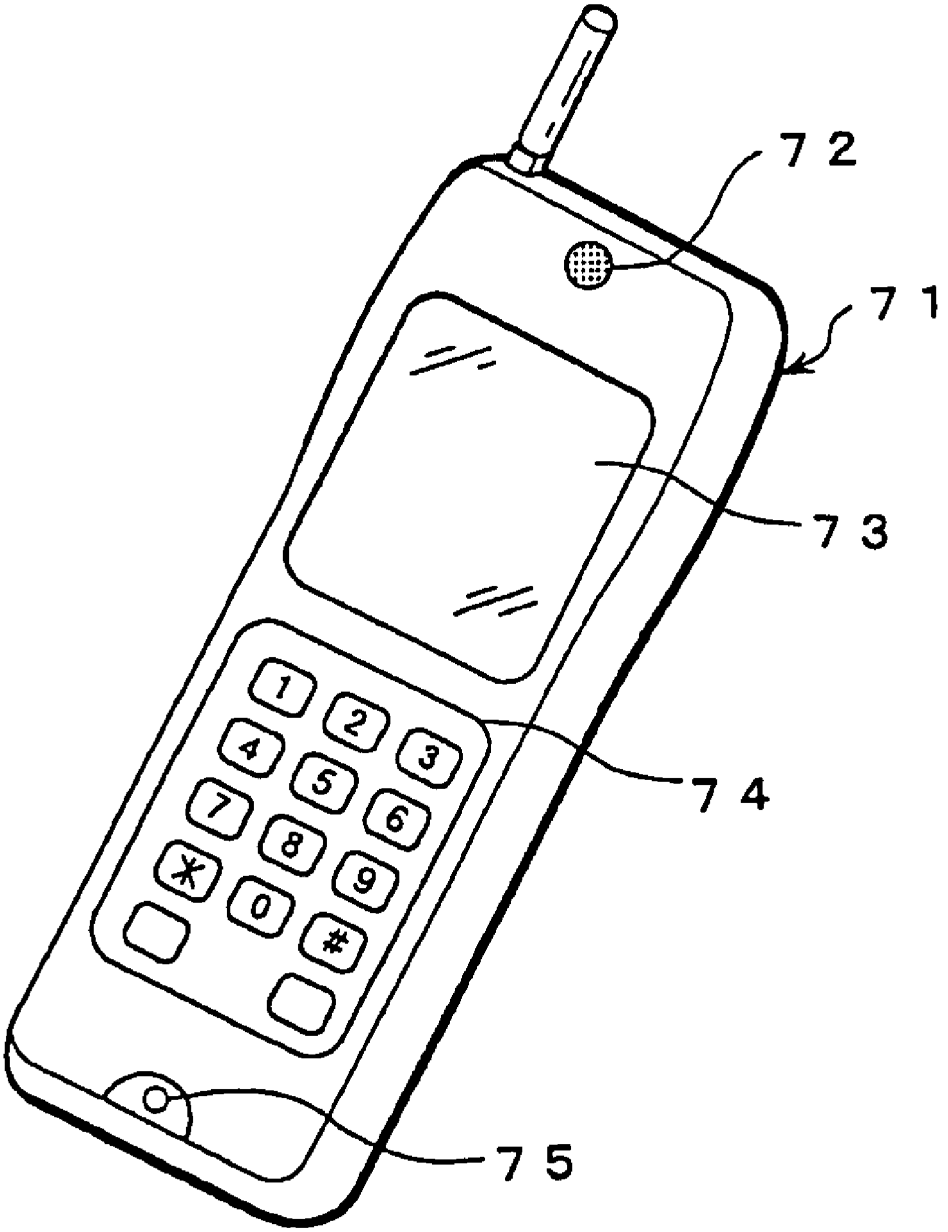
FIG. 11 is a schematic exterior view showing a portable telephone of the present invention.

FIG. 11 is a schematic exterior view showing a portable terminal device of the present invention, for example, a cellular phone.

The cellular phone has, in the front side of a housing 71, a speaker 72, a screen display unit 73, an operation unit 74, and a microphone 75 in order from the top. In the cellular phone, a liquid crystal display device is used as the screen display unit 73. The liquid crystal display device according to the first, second, or third embodiment is used as the liquid crystal display device of the cellular phone.

As described above, in the cellular phone including the screen display unit 73, the liquid crystal display device according to the first, second, or third embodiment is used as the screen display unit 73. By forming, for all the pixels, a discharging path for discharging residual charges, the residual charge in the pixels can be instantaneously discharged by the discharging path. Therefore, in particular, even if a power-off state is suddenly caused such that the user removes a power-supply battery, for example, mistakenly or deliberately, it is ensured that screen distortions formed by a residual image caused by the residual charge can be prevented.

In particular, in the case of using the liquid crystal display device according to the third embodiment, two types of power-off state are selectively used. Specifically, the first power-off mode is selected in which, in a normal power-off state, white level signals are written in all the pixels in the normally white mode, and black level signals are written in all the pixels in the normally black mode. For a sudden occurrence of the power-off state, the second power-off mode is selected which forms a discharging path for discharging residual charge in all the pixels, and which instantaneously discharges the residual charge by the discharging path. This can ensure that screen distortions formed by a residual image caused by the residual charge can be prevented when a power-off state suddenly occurs while an effect of power consumption reduced by the first power-off mode is being maintained.

What is claimed is:

1. A liquid crystal display device comprising:

a pixel section having pixels arranged in a matrix which include active, elements, and signal lines connected to columns of pixels and wherein each pixel has a common electrode and a pixel electrode; and selecting means for selecting one of a first power-off mode and a second power-off mode in accordance with the type of power-off state of said liquid crystal display device, wherein:

in the first power-off mode, in the power-off state, white level signals or black level signals are written in all the pixels while the pixels in said pixel section are first selected in a sequential manner in units of rows; and in the second power-off mode, in the power-off state, the active elements for all the pixels in said pixel section are switched on and all the signal lines are set to each have a potential equal to the potential of common electrodes of the pixels.

2. A liquid crystal display device according to claim 1, further comprising:

a power-off button; and a power-supply battery, wherein said selecting means selects the first power-off mode when the power-off state is caused by operating said power-off button, and selects the second power-off mode when the power-off state is caused by removing said power-supply battery.

3. A portable terminal comprising a liquid crystal display device used as a screen display unit, said liquid crystal display device comprising:

a pixel section having pixels arranged in a matrix which include active elements, and signal lines connected to columns of pixels, and wherein each pixel has a common electrode and a pixel electrode; and selecting means for selecting one of a first power-off mode and a second power-off mode in accordance with the type of power-off state, wherein:

in the first power-off mode, in the power-off state, white level signals or black level signals are written in all the pixels while the pixels in said pixel section are first selected in a sequential manner in units of rows; and in the second power-off mode, in the power-off state, the active elements for all the pixels in said pixel section are switched on and all the signal lines are set to each have a potential equal to the potential of common electrodes of the pixels.

* * * * *